US010394756B2

(12) United States Patent
Bondada et al.

(10) Patent No.: US 10,394,756 B2
(45) Date of Patent: Aug. 27, 2019

(54) SYSTEM AND METHOD FOR CUSTOMIZING ARCHIVE OF A DEVICE DRIVER GENERATOR TOOL FOR A USER

(71) Applicant: Vayavya Labs Private. Limited, Belgaum (IN)

(72) Inventors: Uma Bondada, Belgaum (IN); Sandeep Pendharkar, Bengaluru (IN); Venugopal Kolathur, Belgaum (IN)

( * ) Notice: Subject to any disclaimer, the term of this patent is extended or adjusted under 35 U.S.C. 154(b) by 1098 days.

(21) Appl. No.: 14/669,685

(22) Filed: Mar. 26, 2015

(65) Prior Publication Data

US 2015/0278231 A1 Oct. 1, 2015

(30) Foreign Application Priority Data

Mar. 28, 2014 (IN) ........................... 1661/CHE/2014

(51) Int. Cl.
*G06F 17/30* (2006.01)
*G06F 16/11* (2019.01)

(52) U.S. Cl.
CPC .................................. *G06F 16/113* (2019.01)

(58) Field of Classification Search
CPC ................................................ G06F 17/30073
See application file for complete search history.

(56) References Cited

U.S. PATENT DOCUMENTS 5,202,982 A * 4/1993 Gramlich .......... G06F 17/30171
5,499,330 A * 3/1996 Lucas ................... G06F 3/0483 707/E17.008
5,739,765 A * 4/1998 Stanfield ........... G06F 17/30011 206/425
5,751,287 A * 5/1998 Hahn .................... G06F 3/0481 715/775
6,324,544 B1 * 11/2001 Alam ................ G06F 17/30067
7,349,913 B2 * 3/2008 Clark ................ G06F 17/30174
7,949,662 B2 * 5/2011 Farber ............... G06F 17/30091 707/698
2004/0226024 A1 * 11/2004 Rosenbloom ......... G06F 13/102 719/321
2007/0174362 A1 * 7/2007 Pham .................. G06F 21/6209
2008/0155572 A1 * 6/2008 Kolathur ................... G06F 8/30 719/327

(Continued)

*Primary Examiner* — Tyler J Torgrimson
(74) *Attorney, Agent, or Firm* — The Law Office of Austin Bonderer, PC; Austin Bonderer

(57) ABSTRACT

A system and a processor implemented method for customizing an archive of a device driver generator tool for a user is provided. The system includes (i) a memory unit that stores a database, and a set of modules, and (ii) a processor. The template file obtaining module is configured to obtain information associated with the template files and template files. The configuration file obtaining module is configured to obtain information associated with the configuration files and configuration files. The archive configuration file verification module is configured to verify whether an archive for the configuration files and the template files is pre-existing in the database. The archive file appending module is configured to (i) append the template files and the configuration files to the archive pre-existing in the database. The archive file appending module generates the archive for template files and configuration files upon the archive not pre-existing in the database.

20 Claims, 9 Drawing Sheets

FIG. 4

(56) References Cited

U.S. PATENT DOCUMENTS

| | | | | |
|---|---|---|---|---|
| 2009/0063718 | A1* | 3/2009 | Sekine | G06F 9/4411 710/8 |
| 2009/0064196 | A1* | 3/2009 | Richardson | G06F 8/24 719/327 |
| 2015/0089515 | A1* | 3/2015 | Bondada | G06F 9/44505 719/327 |

* cited by examiner

SYSTEM AND METHOD FOR CUSTOMIZING ARCHIVE OF A DEVICE DRIVER GENERATOR TOOL FOR A USER

CROSS REFERENCE TO RELATED APPLICATIONS

This application claims priority to and the benefit of the provisional patent application number 1661/CHE/2014 titled "System and method for appending files to obtain a customized template archive of a device driver generator tool" filed in the Indian Patent Office on Mar. 28, 2014. This application also incorporates reference to U.S. patent application Ser. No. 11/672,515 for Simplifying generation of device drivers for different user systems to facilitate communication with a hardware device, filed Feb. 07, 2007 (and published Jun. 26, 2008 as U.S. Patent Publication No. 20080155572 A1), now U.S. Pat. No. 7,904,878 and U.S. patent application Ser. No. 14/490,980 for System and method for generating a device driver using an archive of template code, filed Sep. 19, 2014 (and published Mar. 26, 2015 as U.S. Patent Application Publication No. 20150089515 A1), now U.S. Pat. No. 9,250,868. The specification of the above referenced patent application is incorporated herein by reference in its entirety.

BACKGROUND

Technical Field

The embodiments herein generally relates to a system and method for appending files to a template archive, and, more particularly, to a system and method for appending files to obtain a customized template archive for a device driver generator tool.

Description of the Related Art

Pursuant to an exemplary scenario, a device driver refers to a software code (a set of software instructions) that when executed on a system (e.g., a computer), enables the system to interface with an external device (e.g., a printer). The device driver provides appropriate interfaces enabling various software modules executed in the system or hardware components in the system to communicate with and/or to control the external device. For generating a device driver, one has to first write device driver functionalities in specific languages and then uses a compiler that will generate device driver code.

The device driver code may be different for different systems due to differences in the hardware and software characteristics. A device driver generator tool may be designed for use by system developers and IC design engineers to automatically generate device drivers and/or firmwares. One such device driver generator tool is described in U.S. Pat. No. 7,904,878. The device driver generator tool may generate device drivers for different operating systems. A template of the device driver code for a specific CPU organization may be generated based on a manual identification of target architecture. The template of the device driver code may subsequently be used to generate desired device driver functionalities. The template may be used to automatically generate device drivers compliant with 1) the CPU organization, 2) a use in a simulated or in a real platform, 3) an operating system, and 4) an input/output architecture.

In several exemplary scenarios, if a user intends to add additional templates as per his/her requirements to a device driver generator tool so that a device driver code that is generated is more suitable for his/her use, the user may have to provide new templates files to a provider of the device driver generator tool and get the provider to incorporate them into a template archive. In above approach, the configuration and template files developed by the user may, by default, become publicly available to all users of the device driver generator tool. Further, the process of updating the template in the template archive of the device driver generator tool may require more time, and the user would have to wait for the new template to be included in the template archive to make use of the new template for subsequent device driver generation. Accordingly, there remains a need for a system and method for enabling the user to customize the device driver tool with templates based on specific requirements of the user.

SUMMARY

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

A number of systems and processor-implemented methods for customizing an archive of a device driver generator tool for a user are disclosed. The systems and processor implemented methods disclosed herein address the above stated need for customizing device driver generator tool archive based on specific requirements of each individual user. In an embodiment, the system includes a memory unit, and a processor. The memory unit stores a database, and a set of modules. The database includes an archive for storing at least one of (i) one or more template files, (ii) one or more configuration files, and (iii) a directory name. The processor executes the set of modules. The set of modules includes a template file obtaining module, a configuration file obtaining module, an archive configuration file verification module, and an archive file appending module. The template file obtaining module is configured to obtain information associated with the template files and the template files from the user. The configuration file obtaining module is configured to obtain information associated with the configuration files and the configuration files from the user.

The archive configuration file verification module is configured to verify whether an archive for the configuration files and the template files is pre-existing in the database. The archive file appending module is configured to generate the archive for the template files and the configuration files upon the archive not pre-existing in the database and store a unique name and a unique archive identification for the generated archive. The archive file appending module is configured to append the generated archive for template files and the configuration files to a pre-existing archive in the database.

In one embodiment, the archive file appending module is configured to generate the archive using a directory name, a user identifier and an archive count index that gets incremented each time a new archive is appended. In another embodiment, the archive configuration file verification module is further configured to (i) verify whether the generated archive has been previously in use by checking whether a combination of the directory name, the user identifier and the archive count index associated with the generated archive is pre-existing in the database, and (ii) communicate an error message to the user upon the generated archive being previously in use. In yet another embodiment, the archive file appending module is further configured to create a name for the generated archive based on the user identifier and the directory name that are provided by the user as command line arguments and archive count index that is obtained from the database. The user identifier and the directory name along with the archive count index are used to modify the all block labels in the user provided template and configuration files to avoid duplicates of block labels associated with a default template archive. In yet another embodiment, the archive file appending module is further configured to parse a high-level configuration file, corresponding to a class of a device for which a device driver is generated and process one or more labels encountered in a high level configuration file, which is part of the configuration files.

In yet another embodiment, the archive file appending module is further configured to (i) parse (a) the template files, and (b) the configuration files to check whether the block labels are defined therein without duplication, (ii) communicate an error message upon the block labels being defined in duplicate, and (iii) rename the block labels by appending the user identifier, the directory name, and the archive count index to avoid duplication of the block labels pre-associated with the archive pre-existing in the database to which the template files and the configuration files are being appended. In yet another embodiment, the archive file appending module is configured to retrieve the block labels, one or more file labels, and one or more customization tags associated with the template files and the configuration files. In yet another embodiment, the generated archive with the template files and the configuration files is appended to the pre-existing archive in the database and is used for generating a device driver.

In another embodiment, a processor implemented method for customizing a template archive of a device driver generator tool for a user is provided. The processor implemented method includes receiving information associated with one or more template files and one or more configuration files from the user and verifying whether an archive for totality of the configuration files and the template files is pre-existing in a database of the device driver generator tool. The method also includes generating an archive for the template files and the configuration files upon the archive not pre-existing in the database. A unique name and a unique archive identification may be stored for the generated archive. The unique name may include, for example a directory name and the unique archive identification may include for example, a user identifier and an archive count index. The method also includes appending the generated archive to a pre-existing archive in the database.

In another embodiment, the processor implemented method further includes the following steps: (i) determining whether the archive configuration file is existing in the existing archive directory; (ii) checking the archive configuration file in the archive directory upon the archive configuration file existing in the archive directory, parsing it and splitting one or more records into an archive name and an identifier (archive count index); (iii) determining whether the archive name is already in use by comparing the archive name with stored one or more pre-existing archive file names in the archive configuration file in the archive directory of the device driver generation tool; and (iv) generating an error message when the archive name is a duplicate in the database.

In yet another embodiment, the processor implemented method further includes the following steps: (a) reading one or more block labels from the received one or more configuration files; (b) retrieving a block label from among the block labels; (c) searching for the retrieved block label in the received one or more template files and determining whether the block label is defined in the received one or more template files; (d) printing a warning message upon the block label not being defined in the template files; (e) determining whether the block label is defined in duplicate in the template files upon the block being defined in the template files; (f) generating an error message upon the block labels being specified in duplicate; (g) modifying the block label using the user identifier and archive count index to obtain a modified block label upon the block label not being specified in duplicate; (h) updating (A) the configuration files, and (B) the template files with the modified block label; (i) determining whether the processed block label is a last block label from among the block labels; (j) retrieving a next subsequent block label and repeating steps c) to i) for the retrieved subsequent block label, upon the modified block label not being the last block label; (k) generating a new template archive upon the modified block label being identified as the last block label; and (l) appending the generated new archive name and an archive count index to the archive configuration file.

In yet another embodiment, the user is allowed to organize the template files and the configuration files into a template files folder and a configuration files folder respectively, upon the user intending to make changes in the template files and the configuration files respectively. In yet another embodiment, the processor implemented method further includes the step: (i) receiving a user identifier and a directory name from the user; (ii) creating a name for the generated archive file based on the user identifier and the directory name that are provided by the user as command line arguments and the archive count index obtained from the archive configuration file. The user identifier, the directory name and archive count index are appended to all block labels in the new configuration and template files to avoid accidental duplication of block labels associated with a default template archive. In yet another embodiment, the processor implemented method further includes the steps: (i) parsing a high-level configuration file, corresponding to a class of a device for which a device driver is generated; and (ii) processing one or more labels encountered in a high level configuration file, which is part of the configuration files.

In yet another aspect, a non-transitory machine-readable medium carrying one or more sequences of instructions, which cause the processors to execute a method, is provided. The method includes the following steps: (i) receiving information associated with the template files and the configuration files from the user; (ii) verifying whether an archive for totality of the configuration files and the template files is pre-existing in a database of the device driver generator tool; (iii) generating the archive associated with the template files and the configuration files and appending the generated archive to a pre-existing archive upon the archive associated with the template files and the configuration files not pre-existing in the database; (iv) storing a unique name and a unique archive identification (archive count index) for the generated archive in the archive configuration file upon the archive not pre-existing in the database; and (v) generating an error message if the generated archive is already pre-existing in the database.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1:
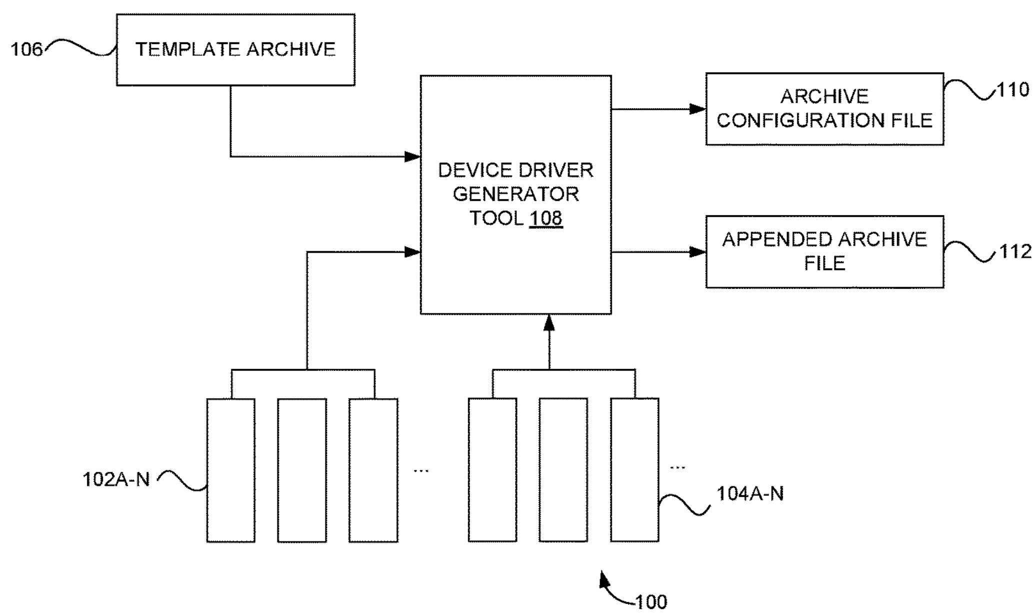
FIG. 1 is a block diagram illustrating appending of configuration files and template files to obtain an appended archive file by a device driver generator tool according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Various embodiments of the present technology provide systems and methods for customizing an archive of a device driver generator tool for a user. The systems and methods disclosed herein enable appending template files and configuration files provided by a user to an existing archive of device driver generator tool. The systems and methods disclosed herein allows the user to create new templates that will be available for use only by the user creating the templates and allows the user to start using the newly appended configuration files and template files immediately subsequent to appending. Additionally, the systems and methods of the present technology allows the user to modify the appended configuration files and template files in case errors or for enhancements without having to wait for the software provider to update the archive and send back to the user.

Referring now to the drawings, and more particularly to FIGS. 1 through 6, where similar reference characters denote corresponding features consistently throughout the figures, there are shown preferred embodiments.

A hardware designer (person) designs the architecture of a hardware device (for which a device driver is to be generated) such as the number of registers, the memory used and program logic using which external devices can communicate with the target hardware device. The program logic may specify the manner in which status information (e.g., from a register indicating the status of a pending interrupt) can be retrieved, the manner in which data can be written to various components in the hardware device, and sending/receiving a sequence of data elements. The communication can thus form the basis for controlling the hardware device and/or specifying the various states of the hardware device, the actions that need to be performed for the hardware device to undergo a desired change of state and the manner in which such changes of states are effected. The hardware designer includes the identifiers of registers, details of program logic for communicating with hardware device according to a pre-specified formal language (having a non-ambiguous syntax/semantics, thereby lending to machine processing). The information is referred to as device specification, which may also contain other information (e.g., version number, manufacturer name, etc.) about the hardware device.

As the program logic and register information is consistent with pre-specified formal language, device driver generator (software code) may be designed to parse the contained information and generate software instructions (constituting hardware interface) consistent with the language specification, as required for implementation in the runtime environment. The program logic, the register information and other characteristics of the hardware device are embedded in datasheet in electronic form and device driver generator extracts the embedded information while generating the device drivers. As may be appreciated, the instructions contained in the device driver (constituting runtime environment interface) would depend on the various characteristics of the runtime environment. Accordingly, according to another aspect of the present invention, device driver developer may provide software specification containing information about various characteristics of the runtime environment in which a user application needs to communicate with the hardware device.

Software specification is also specified in a formal language (may be similar to/different from the formal language used for device specification) to remove ambiguity in specifying the characteristics of the environment. Software specification database stores the various software specifications created by device driver developer. The software specifications may be used to generate runtime environment interface, in addition to hardware interface. The device driver developer may also specify the manner (name and access approach) in which applications (executing in the runtime environment) access the various features of the device driver (corresponding to application interface). In the embodiment described below, the manner in which applications access various features of the device driver is specified in software specification in the formal language. As such, software specification is used to generate application interface as well.

Device driver generator (provided according to an aspect of the present invention and implemented in the form of a computer implemented utility) receives device specification (embedded in data sheet) and also software specification (either from device driver developer or from software specification database) and generates the software instructions contained in device driver code. The manner in which device driver generator generates instructions constituting a device driver from a formal language specification A device driver generator receives a specification in a formal language containing a program logic, which specifies the manner in which external devices can communicate with the target hardware device. Some aspects of the communication may assist in controlling the hardware device, while other aspects may cause a desired change of state in a hardware device. The specification also contains characteristics of a runtime environment. The specification may contain multiple parts, for example, a device specification specifying the program logic, and a software specification specifying the characteristics of the runtime environment. The software specification also may specify the manner in which application may access the various features of the device driver.

The device driver generator forms instructions constituting a device driver, which incorporates the program logic according to the characteristics of the runtime environments such that a user application executing in the runtime environment can communicate with the hardware device using the device driver. Device driver generator forms instructions constituting hardware interface by incorporating the program logic for communication with the hardware device. Instructions constituting application interface and runtime environment interface are formed based on the characteristics of the runtime environment specified in the specification. It may be appreciated that instructions constituting the various interfaces in the device driver can be formed from the received specification by device driver generator, thereby potentially generating a complete device driver (capable of communicating with the hardware device) programmatically.

Configuration file: A configuration file is a file containing a sequence of labels. These labels comprise XML tags and notify (or indicate) the device driver generation tool the sequence in which different blocks of template code has to be dumped in the output driver code that is being generated. The names of configuration files are rules based. These rules are specified in rules.txt file.

Template code: Device driver code can be viewed as consisting of two more or less distinct parts. One part is dependent on an operating system driver framework for a specific device class (a device class but not limited to, such as Ethernet, USB peripheral, USB host, etc) and the other part is completely dependent on the specific device (a specific device belonging to a particular device class, such as Intel 82567 Ethernet card). Part of code that is an operating system driver framework dependent will remain more or less unchanged irrespective of the hardware device for which a device driver is being generated. Such code is referred to as template code. The template code may comprise a set of codes (e.g., or a set of instructions) that are dependent of a specific hardware device for which device driver is being generated. Such device dependent code appearing as part of the template code is represented in template code using customization tags.

Label: A label may appear as part of a configuration file or as part of template code. The labels that appear in configuration files can either be a block label or a file label. All labels will be XML tags. Block label: A block label in a configuration file represents a block of template code. All block labels and corresponding blocks of code will be defined in template code files. A block label may be expanded to one or more complete functions in C or just a single line of code that will be part of a C function. File label: A file label will appear only in a configuration file and represents another configuration file to be parsed rather than a block of code. A configuration file is set as a high-level configuration file.

The method for generating a device driver code using template driver code is executed on a processor implemented system comprising one or more hardware processors, a memory storing instructions to configure the one or more hardware processors. The processor implemented system may comprise any of a computer system such as a personal computer, a laptop, a smartphone, a tablet PC, or a computing system that is capable of archiving template codes into a template archive and generating a device driver using an archived template code. The one or more hardware processors are configured by the instructions to execute the device driver generation tool on the processor implemented system. The device driver generation tool when executed by the one or more hardware processors generates a device driver based on an archived template code. The device driver generation tool comprises a database that stores (i) a template archive comprising a plurality of configuration files (e.g., the configuration files) and a plurality of template files (e.g., the set of template files), (ii) a set of predefined rules, (iii) a first specification comprising a hardware device specification (also referred to as a device program specification) and (iv) a second specification comprising a software specification (also referred to as a run time specification) for generating the device driver specific to the hardware device and an operating system. One or more high level configuration files and one or more of low level configuration files are part of the configurations files in an example embodiment. The configuration files and template files are extracted from the template archive (e.g., extracted in an encrypted form) by the device driver generation tool. The one or more low level configuration files and the one or more high level configuration files comprises one or more labels. The device driver generation tool starts parsing the high-level configuration file, corresponding to a class of the hardware device and the operating system for which the device driver is being generated, which is part of the configuration files and processes the various labels encountered in the high level configuration file (which is part of configuration files) as follows (i) when device driver generation tool encounters a file label it starts processing the low-level configuration file (which is part of the configuration files) corresponding to that file label (ii) when a block label is encountered, the device driver generation tool searches for that block label in all the template files and extracts a template code block corresponding to the block label. As way of clarity, the device driver generation tool parses at least one high-level configuration file from the one or more high level configuration files, corresponding to a class of the hardware device, and the operating system for which the device driver is being generated. The device driver generation tool simultaneously processes at least one label associated with the at least one high-level configuration file to obtain an identified label. Further, when the identified label is a block label, the device driver generation tool (i) extracts template code from the plurality of template files for the block label (e.g., an identified block label) to obtain an extracted template code, and (ii) generates a portion of the device driver corresponding to the block label based on the extracted template code. During this process, the device driver generation tool also checks whether there are any duplicates of block labels. If there are any duplicates of block labels, they are removed (or deleted). Likewise, when the identified label is a file label, the device driver generation tool (i) parses at least one low-level configuration file from the one or more low-level configuration files, and (ii) generates the device driver using the first specification and the second specification based on the at least one low-level configuration file. The device driver generation tool proceeds to dump the template code as an output till it encounters any customization labels. The code that corresponds to any customization label is synthesized using rules in an internal customization tag processing rules database and dumped as an output. This processing is continued till the device driver generation tool reaches the end of the high-level configuration file, which is part of the configuration files.

FIG. 1 depicts a block diagram 100 illustrating appending of one or more configuration files 102A-N and one or more template files 104A-N to obtain an appended archive file by a device driver generator tool 108 according to an embodiment herein. The block diagram 100 includes the configuration files 102A-N, the template files 104A-N, a template archive 106, an archive configuration file 110, and an appended archive file 112. As used herein the term "configuration file" refers to a file that includes a sequence of labels as opposed to archive configuration file that will contain information associated with all 25 appended archives in terms of names and unique identifiers (such as, archive count indices). The sequence of labels may be for example, extensible markup language (XML) tags. A name associated with the configuration file may be rules based. The rules for creating the name of a configuration file may be specified in for example, a "rules.txt" file. As used herein the term "template file" refers to a file comprising template code blocks, enclosed in opening and closing block labels, the template code blocks being a part of a code dependent on an operating system driver framework for a specific device class (for example, a device class such as Ethernet, USB peripheral, and USB host) remaining more or less unchanged irrespective of a specific device of that the specific device class for which a device driver is being generated.

In an embodiment, a user may provide the template files 104A-N associated with new block labels, and new customization tags. A block label may appear as part of the configuration file or as part of the template code. The labels that appear in the configuration files can either be a block label or a file label. A block label in the configuration file represents a block of the template code. The block labels and corresponding blocks of code may be defined in the template code files. A file label may appear only in the configuration file and represents another configuration file to be parsed rather than a block of code. A customization tag is used in the template code block whenever device specific code has to be generated as part of the template code block. The customization tags may appear in the template code enclosed between the special characters —'@ at the start and @' at the end. In an embodiment, the user may provide customization tag processing rules and a device specific code when the new customization tags are used. The user may provide the configuration files 102A-N.

Figure 2:
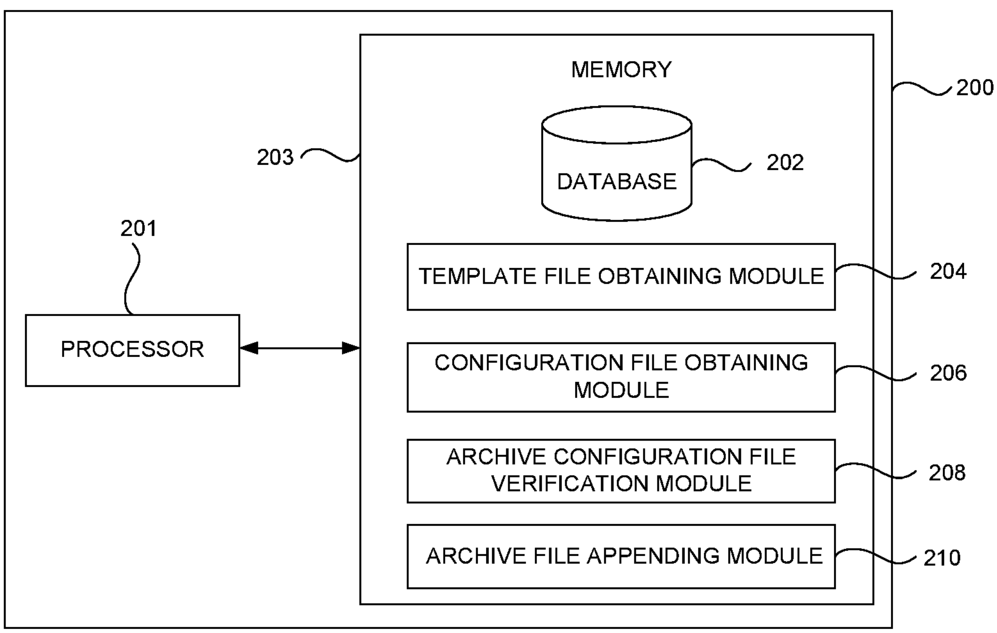
FIG. 2 illustrates a block diagram representing a system of the present technology that may be deployed in the device driver generator tool of FIG. 1 according to an embodiment herein.

The user may add the configuration files 102A-N and the template files 104A-N to an existing archive of block labels and file labels. FIG. 2 illustrates a block diagram representing system 200 of the present technology that may be deployed in the device driver generator tool 108 of FIG. 1 according to an embodiment herein. The system 200 includes one or more processors such as processor 201 and a memory 203 storing instructions defined by one or more modules of the system 201 to configure the processors to execute instructions. The memory includes a database 202 and one or more modules including a template file-obtaining module 204, a configuration file obtaining module 206, an archive configuration file verification module208, and an archive file appending module 210. In an embodiment, the database 202 may represent an organized collection of data associated with the device driver generation tool 108 of FIG. 1. In an embodiment, the database 202 may include an archive for storing the template files 104A-N of FIG. 1, the configuration files 102A-N of FIG. 1, and a directory name. The template file-obtaining module 204 obtains the information associated with one or more template files (such as template files 104A-N of FIG. 1) and the template files from the input provided by the user. The configuration file obtaining module 206 obtainsthe information associated with one or more configuration files (such as configuration files 102A-N of FIG. 1) and the configuration files from the input provided by the user.

The archive configuration file verification module 208 verifies whether an archive of block labels and file labels for the configuration files 102A-N and the template files 104A-N is pre-existing in the database 202. In an embodiment, the archive file appending module 210 appends the configuration files 102A-N and the template files 104A-N received from the user to the archive of block labels and file labels pre-existing in the database 202. The archive file appending module 210 generates an archive of block labels and file labels for the configuration files 102A-N and the template files 104A-N upon the archive not pre-existing in the database 202 and stores a unique name and a unique archive identification (archive count index) for the newly generated archive of block labels and file labels at an end of the archive configuration file 110. In one embodiment, the generated archive appended of block labels and file labels with the template files 104A-N and the configuration files 102A-N is used for generating a device driver. The archive file appending module 210 generates the archive using a directory name, a user identifier and an archive count index. In one embodiment, the archive file appending module 210 creates a name for the generated archive of block labels and file labels based on the user identifier and the directory name that are provided by the user as command line arguments along with an archive count index. The user identifier and the directory name along with the archive count index are appended to block labels to avoid duplicates of block labels associated with a default template archive. In an embodiment, the system 200 allows the user to organize one or more configuration files 102A-N and one or more template files 104A-N in the archive upon the user intending to make changes in one or more template files 104A-N and/or one or more configuration files 102A-N. In an embodiment, the user may make changes in the one or more template files 104A-N and/or one or more configuration files 102A-N by providing customization tag processing rules and the device specific code.

In one embodiment, the archive file appending module 210 parses a high-level configuration file forming part of the configuration files 102 A-N and corresponding to a class of a device for which a device driver is generated and processes the labels encountered in the high level configuration file. In an embodiment, the archive file appending module 210 parses (i) the template files 104A-N, and (ii) the configuration files 102A-N to check whether one or more block labels are defined without duplication. In an embodiment, the archive file appending module 210 communicates an error message upon the block labels being defined in duplicate. The archive file appending module 210 renames the block labels by appending the user identifier and the directory name along with the archive count index to avoid duplication of the block labels pre-associated with the archive pre-existing in the database to which the template files 104A-N and the configuration files 102A-N are appended.

In an embodiment, the archive configuration file verification module 208 verifies whether the generated archive of block labels and file labels has been previously in use by checking whether a combination of the directory name and the user identifier and archive count index associated with the generated archive is pre-existing in the database 202. The archive configuration file verification module 208 communicates an error message to the user upon the generated archive of block labels and file labels being previously in use. The archive configuration file 110 of FIG. 1 may include a name associated with an appended archive of block labels and file labels and an archive identification (ID) (an archive count index) of the appended archive of block labels and file labels. If the archive configuration file 110 of FIG. 1 is present then the sequence number or archive count index of the last appended archive is determined. Similarly, the sequence number or archive count index is updated for generating a new archive of block labels and file labels file. The user provides the template files 104A-N and configuration files 102A-N associated with new block labels, new file labels, and new customization tags. The customization tags corresponding to device driver code are generated based on the customization tag processing rules and possibly a device specific code received from the user. The archive file appending module 210 retrieves the block labels, the file labels, and the customization tags associated with the template files 104A-N and the configuration files 102A-N. The archive file appending module 210 generates one or more device specific code blocks to the template files 104A-N.

In an embodiment, the device driver generator tool 108 comprising the system 200 may be executed with special options specifying the user identifier (e.g., a user id) and the new directory as arguments. The system 200 of the device driver generator tool 208 may generate a new archive of block labels and file labels using a directory name associated with the new directory and the user identifier and archive count index when one or more template files 104A-N and/or one or more configuration files 102A-N are added to the device driver generator tool 108. The device driver generator tool 108 generates the new archive and stores a unique name and unique archive identification (sequence number or archive count index) for the newly generated archive at an end of the archive configuration file 110. In one embodiment, the device driver generator tool 108 allows the user to append the one or more template files 104A-N in the template file folder and the one or more configuration files 102A-N in a configuration file folder. In an embodiment, the device driver generator tool 108 creates a name for a new archive of block labels and file labels file based on the user identifier and the directory name that are provided by the user as command line arguments along with the archive count index. In one embodiment, a new configuration file and a new template file are prepared to be used by the device driver generator tool 108 for driver generation by modifying all block labels by appending a specific user ID and archive count index such that there are no duplicates of any block labels which are present in a default template archive. The block labels may support reuse of device driver code blocks for generation device drivers for different devices that are being used in the same operating system.

Although the present embodiments have been described with reference to specific example embodiments, it will be evident that various modifications and changes may be made to these embodiments without departing from the broader spirit and scope of the various embodiments, for example, the various modules, such as the template file obtaining module 204, the configuration file obtaining module 208, and the archive configuration file verification module 208, and archive file appending module 210, memory 203, processor 201 described herein may be enabled and operated using a firmware, software and/or hardware circuitry or any combination of hardware, firmware, and/or software (e.g., embodied in a machine readable medium). Also various devices and methods disclosed herein may be embodied using transistors, logic gates, and electrical circuits (e.g., Application Specific Integrated (ASIC) Circuitry and/or in Digital Signal Processor (DSP) circuitry).

The embodiments herein can take the form of, an entirely hardware embodiment, an entirely software embodiment or an embodiment including both hardware and software elements. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor (such as processor 201) coupled directly or indirectly to memory elements through a system bus. The memory elements (such as memory 203) may include local memory employed during actual execution of the program code, bulk storage, and cache memories which provide temporary storage of at least some program code in order to reduce the number of times code must be retrieved from bulk storage during execution. Input/output (I/O) devices (including but not limited to keyboards, displays, pointing devices, remote controls, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 3A:
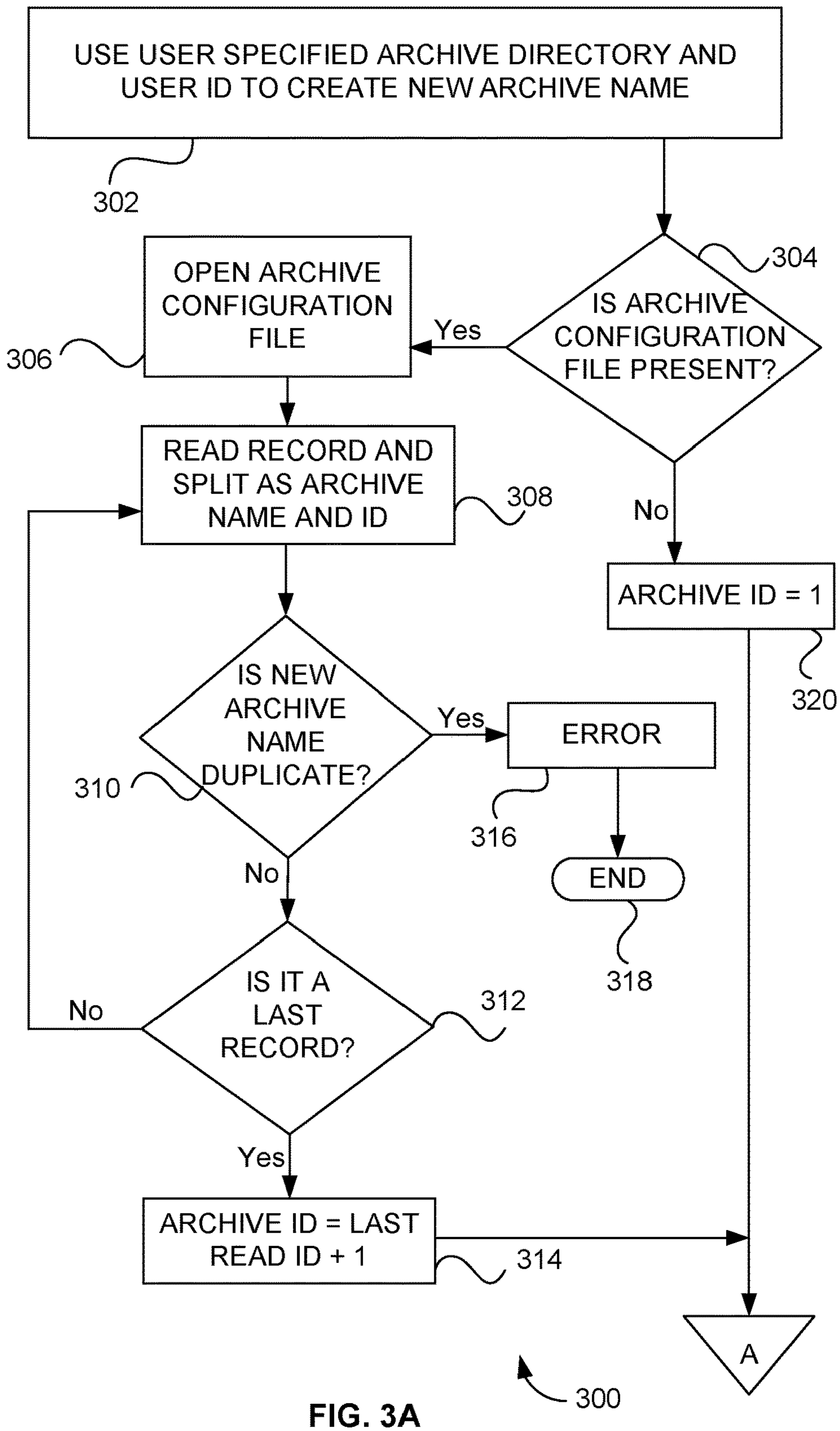
FIGS. 3A-3C is a flow diagram illustrating a method of appending new configuration files and new template files to a template archive according to an embodiment herein.
Figure 3B:
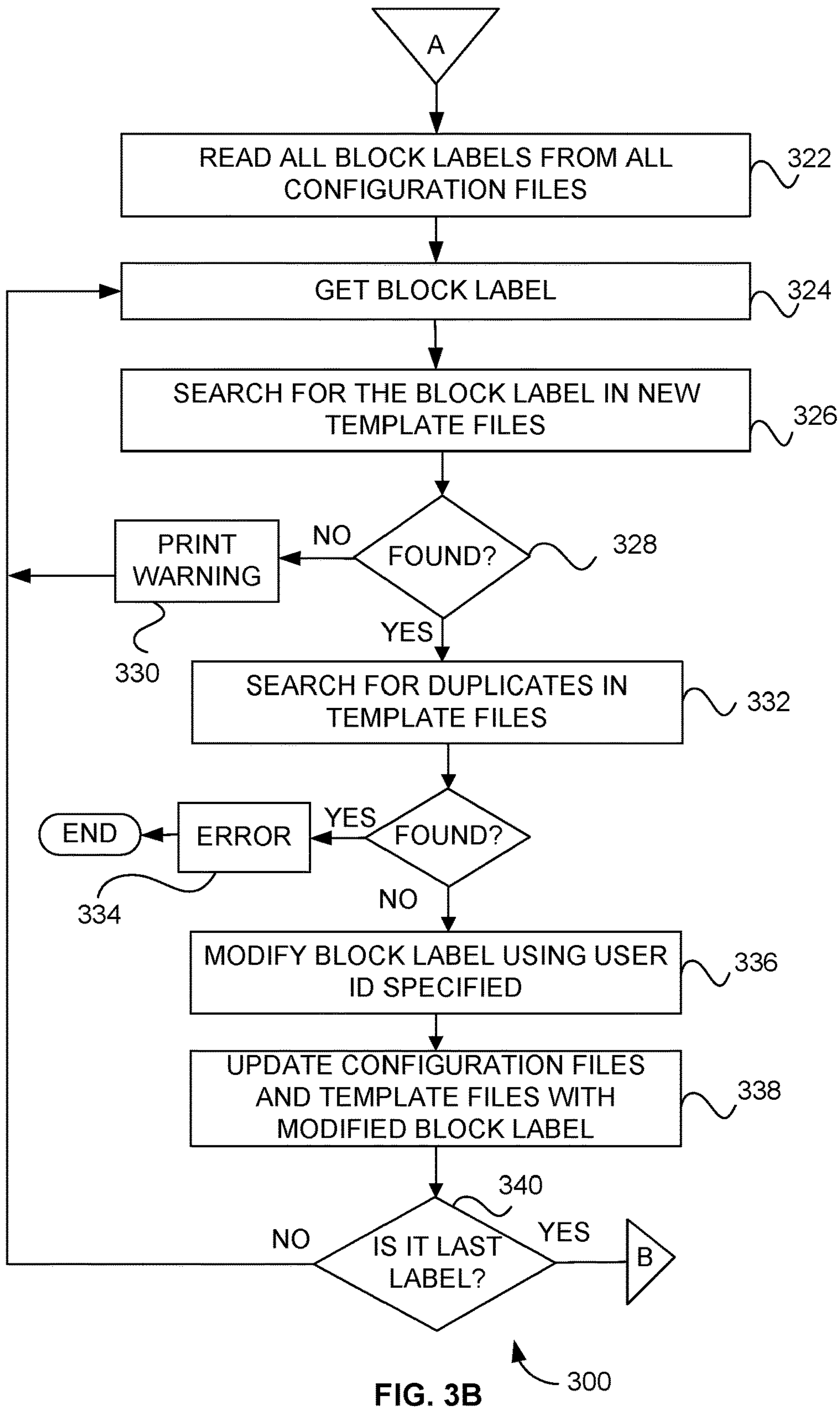
Figure 3C:
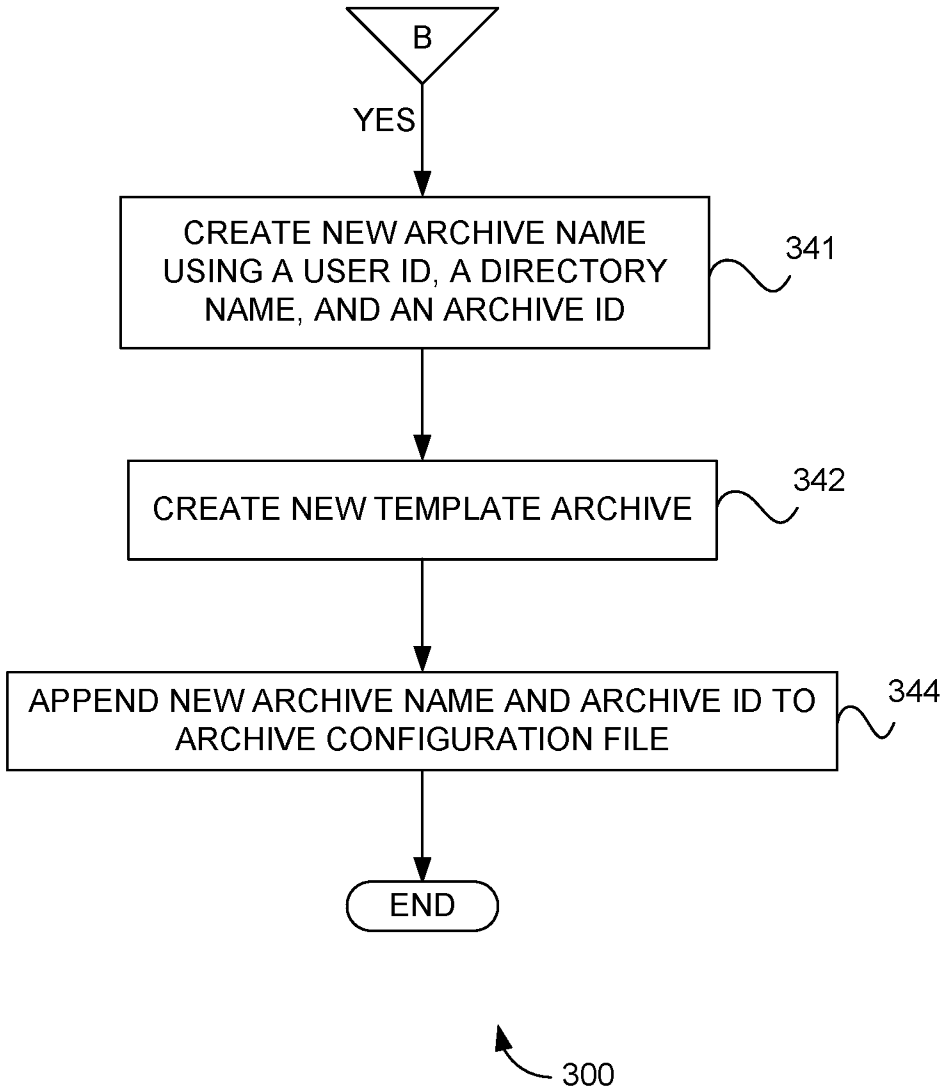

FIG. 3A, 3B and 3C is a flow diagram 300 illustrating a method of appending new configuration files and new template files to a template archive according to an embodiment herein. In step 302, an archive directory and a user identifier that are specific to the user are obtained to create a new archive name. In step 304, verification is performed to determine whether an archive configuration files is present. If an archive configuration file is not present, a unique archive identification (ID) (or archive count index) is set to 1. If at step 304, it is determined that an archive configuration file is present, then step 306 is performed. At step 306, the archive configuration file is opened and step 308 is performed. At step 308, the data records in the configuration file are read and split into an archive name and the unique archive ID (archive index count). In step 310, verification is done to check whether the archive being appended is already present in the archive configuration file pre-existing in the database 202. In step 341 a new archive name is created based on the user id, directory name and user ID received as a command line arguments along with the archive count index. In step 310, verification is performed to check whether the name of the appended files is already in use by comparing the file name with the archive file names in the archive configuration file present in the database 202.

If the new archive name is a duplicate, then an error message is notified in step 316 and the process is terminated in step 318. In step 312, when the new archive name is not a duplicate then a check is performed to determine whether the archive name that was read from the archive configuration file is the last record. In step 314, when the last record is determined then an archive id (archive count index) is incremented by 1 to get the new archive ID (archive count index) to be used. If the last read archive record is not the last record, the steps 308-310, and 316-318 are repeated. In step 320, if the archive configuration file is not present then the archive ID is set to 1.

In step 322, one or more block labels are read from the configuration files 102A-N of FIG. 1. In step 324, a block label is obtained. In step 326, the block label is searched in the new template files. In step 328, a check is performed to determine whether the block labels are defined in the template files 104A-N of FIG. 1. In step 330, if the block label is not defined, then a warning message is printed. In step 332, if the block label is defined, then a check is performed to determine whether the block label is defined only once and no duplicate block labels have been specified. In step 334, if duplicate block labels have been specified, and then an error message is communicated. In step 336, if duplicate block labels are not specified, then the block label is modified using the specified user identifier and archive ID (archive count index) to obtain a modified block label. In step 338, the configuration files 102A-N of FIG. 1 and the template files 104A-N of FIG. 1 are updated with the modified block label. In step 340, a check is performed to determine whether the modified block label is the last block label. In step 342, a new template archive is generated when the modified block label is identified as the last block label. In step 344, new archive name and archive ID (sequence ID or archive count index) are appended to the archive configuration file.

Figure 4:
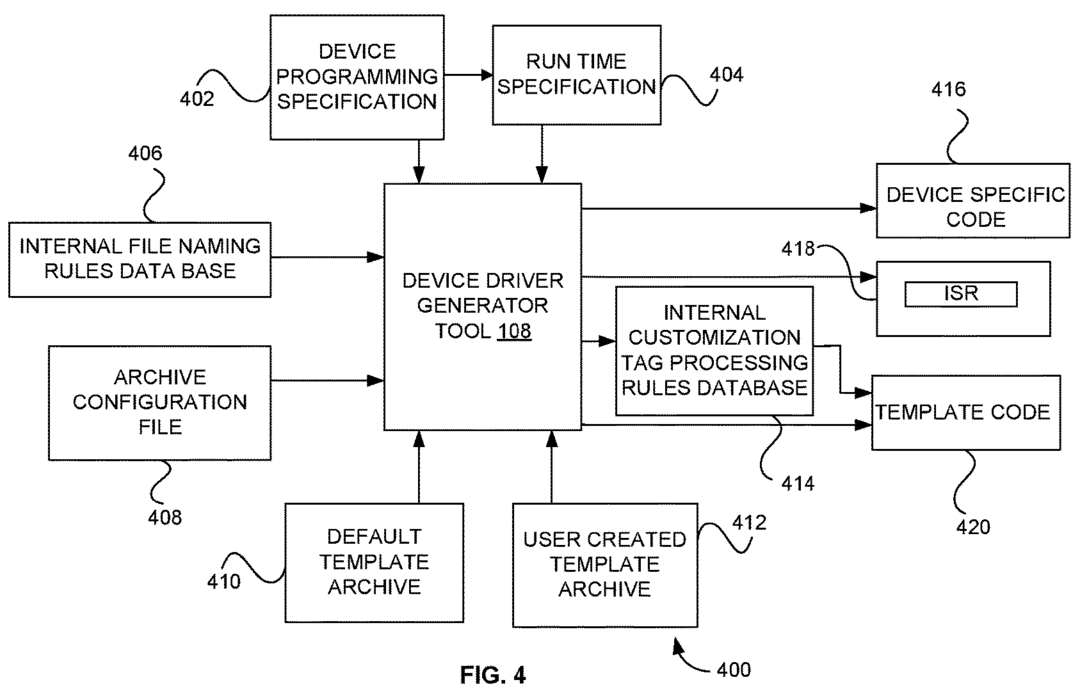
FIG. 4 is a block diagram illustrating a device driver code generation based on the appended archive file according to an embodiment herein.

FIG. 4 is a block diagram 400 that illustrates a device driver code generation based on the appended archive file 112 of FIG. 1 according to an embodiment herein. The block diagram 400 includes a device programming specification (DPS) 402, a run time specification (RTS) 404, an internal file naming rules data base (IFNRDB) 406, an archive configuration file 408, a default template archive 410, a user created template archive 412, an internal customization tag processing rules data base (ICTPRDB) 414, a device specific code 416, an ISR code 418, and a template code 420.

The device driver generator tool 108 reads upon one or more entries in the archive configuration file 408 and extracts one or more configuration files 102A-N and the template files 104A-N from the user created template archive 412. The device driver generator tool 108 parses a high-level configuration file, corresponding to a class of the device for which a device driver is being generated, which is part of the configuration files. Then it processes various labels encountered in the high level configuration file, which is part of the configuration files 102A-N of FIG. 1.

The process of encountering various labels is as follows: (i) when the device driver generator tool 108 encounters a file label, then it starts processing a low-level configuration file which is part of the configuration files 102A-N of FIG. 1 and is identified based on the file label, (ii) when a block label is encountered, then the device driver generator tool 108 searches for a block label in the template files 104A-N, and (iii) extracts a template code block corresponding to the block label. The device driver generator tool 108 proceeds to print the template code into an output file till it finds a customization tag. A code that corresponds to any customization tag is synthesized using rules in an internal customization tag processing rules database 414 and this synthesized code is printed into the output file. This process is continued till the device driver generator tool 108 reaches the end of the high-level configuration file, which is part of the configuration files.

Figure 5A:
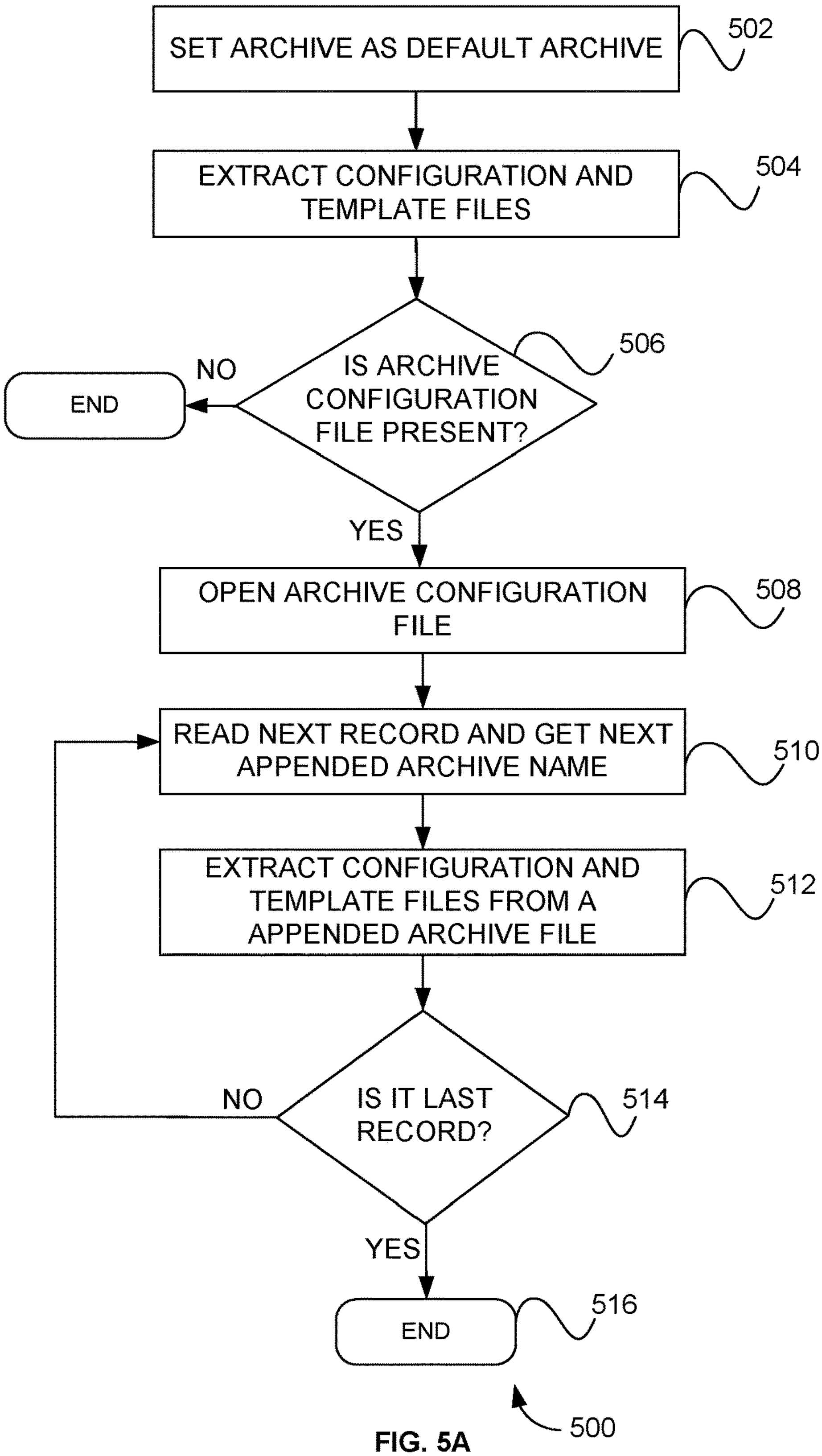
FIG. 5A is a flow diagram illustrating a method of extracting the configuration files, the template files from a default archive and a appended archive according to an embodiment herein.

FIG. 5A is a flow diagram illustrating a method of extracting the configuration files 102A-N, and the template files 104A-N of FIG. 1 from the default archive and the appended archive according to an embodiment herein. In step 502, an archive is fixed as a default template archive. In step 504, the configuration files 102A-N of FIG. 1 and the template files 104A-N of FIG. 1 are extracted. In step 506, a check is performed to determine whether an archive configuration file 110 of FIG. 1 is present or not. In step 508, the archive configuration file 110 of FIG. 1 is opened. In step 510, a next record of the archive configuration file 110 of FIG. 1 is read and a next appended archive name is obtained. In step 512, the configuration files 102A-N of FIG. 1 and the template files 104A-N of FIG. 1 are extracted from the appended archive of block labels and file labels file currently being processed. In step 514, a check is performed to determine whether a last record of the archive configuration file has been read in or not. In step 516, if the last record has been read in, then process may end.

Figure 5B:
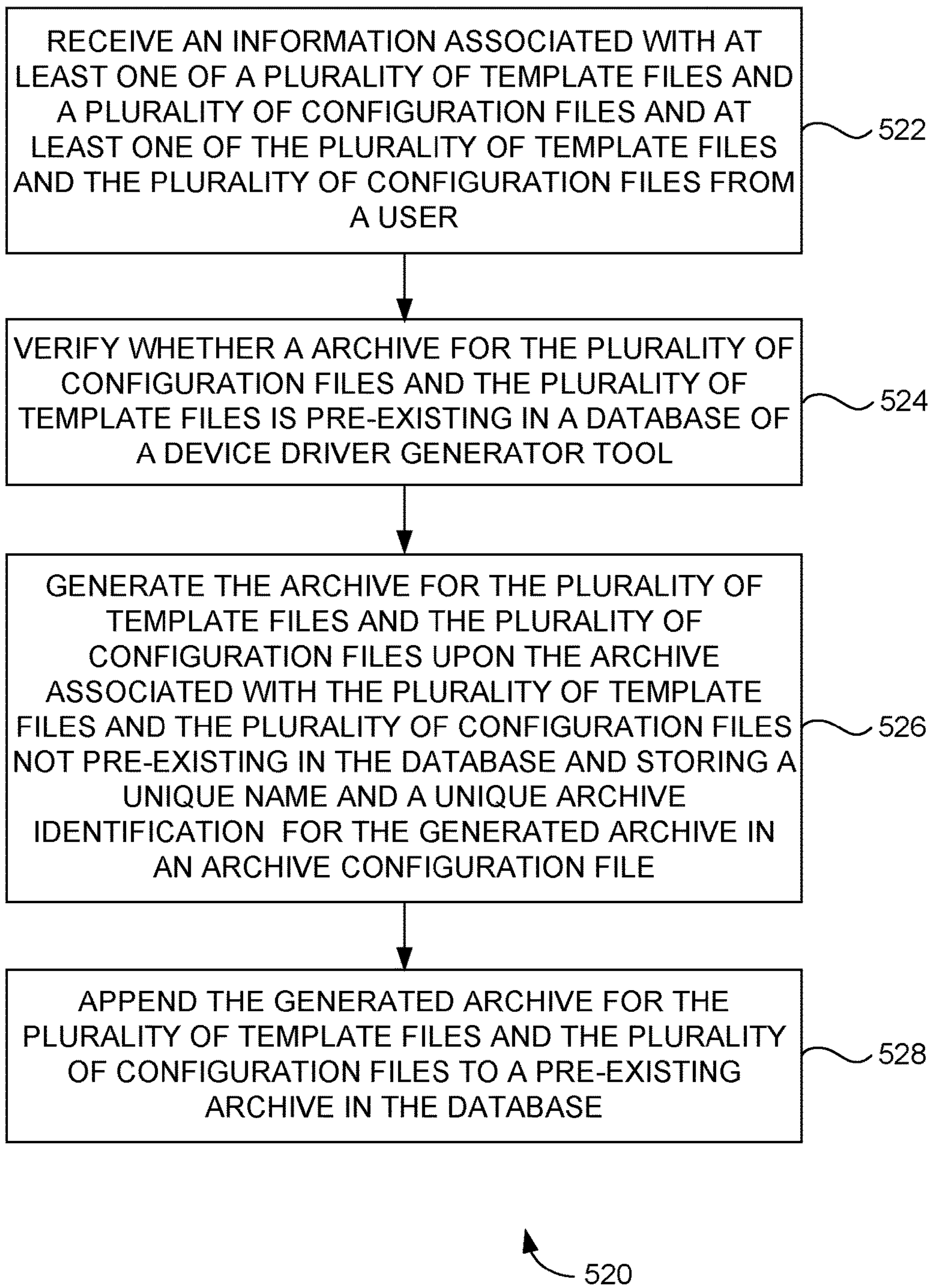
FIG. 5B depicts a flow diagram illustrating a processor implemented method of customizing an archive of a device driver generator tool for a user, in accordance with an embodiment.

FIG. 5B depicts a flow diagram illustrating a processor implemented method 520 of customizing an archive of a device driver generator tool for a user, in accordance with an embodiment. The method 520 starts at step 522. At step 522, information associated with a plurality of template files and/or a plurality of configuration files and the plurality of template files and/or the plurality of configuration files is received from a user. At step 524, it is verified whether the archive for each of the plurality of configuration files and the plurality of template files is pre-existing in a database of the device driver generator tool. At step 526, an archive of the plurality of template files and the plurality of configuration files is generated upon the archive not pre-existing in the database. A unique name and a unique archive identification is stored for the generated archive. At step 528, the archive generated, at step 526, for the plurality of template files and the plurality of configuration files upon the archive not pre-existing in the database is appended to the pre-existing archive in the database.

The embodiments herein can take the form of, an entirely hardware embodiment, an entirely software embodiment or an embodiment including both hardware and software elements. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, remote controls, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 6:
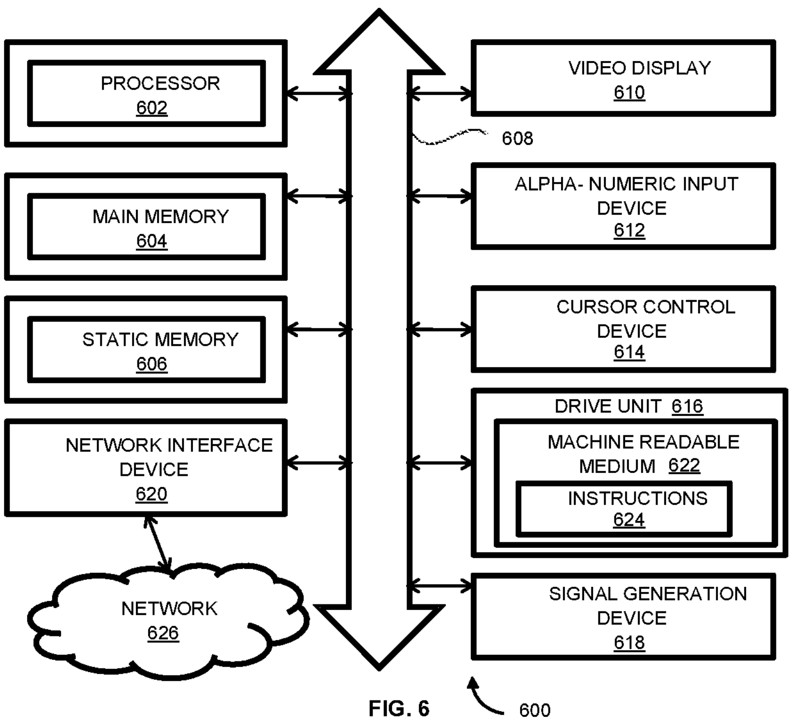
FIG. 6 illustrates a schematic diagram of a computer architecture used in accordance with the embodiment herein.

FIG. 6 depicts a functional block diagram of an example general-purpose digital computing environment 600 that may be used to implement various aspects of the present technology disclosed herein (such as for example, the system 200). The general purpose digital computing environment of FIG. 600 includes a processor 602, a main memory 604, a static memory 606, a bus 608, a video display 610, an alpha-numeric input device 612, a cursor control device 614, a drive unit 616, a signal generation device 418, a network interface device 620, a machine readable medium 622, instructions 624, and a network 626, according to one embodiment.

The processor 602 may be include, but is not limited to a microprocessor, a state machine, an application specific integrated circuit, a field programmable gate array, etc. (e.g., an Intel® Pentium® processor). The main memory 604 may be a dynamic random access memory and/or a primary memory of a computer system. The static memory 606 may include for example a hard disk drive for reading from and writing to a hard disk (not shown), a magnetic disk drive for reading from or writing to a removable magnetic disk, or an optical disk drive for reading from or writing to a removable optical disk such as a CD ROM or other optical media. The drives and their associated computer-readable media provide non-volatile storage of computer readable instructions, data structures, program modules and other data for a computer. It will be appreciated by those skilled in the art that other types of computer readable media that can store data that is accessible by a computer, such as magnetic cassettes, flash memory cards, digital video disks, Bernoulli cartridges, RAMs, ROMs, and the like, may also be used in the example general purpose computing environment 600.

The bus 608 may be an interconnection between various circuits and/or structures of the purpose computing environment 600. The video display 610 may provide a graphical representation of information on the data processing system. The alpha-numeric input device 612 may be a keypad, a keyboard and/or any other input device of text (e.g., a special device to aid the physically handicapped), a microphone, joystick, game pad, satellite dish, scanner or the like. The alpha-numeric input device 612 is often connected to the processing unit through a serial port interface that is coupled to the system bus, but may be connected by other interfaces, such as a parallel port, game port or a universal serial bus (USB).

The cursor control device 614 may be a pointing device such as a mouse. The drive unit 616 may be the hard drive, a storage system, and/or other longer term storage subsystem. The signal generation device 618 may be a bios and/or a functional operating system of the data processing system. The network interface device 620 may be a device that performs interface functions such as code conversion, protocol conversion and/or buffering required for communication to and from the network 626. The machine readable medium 622 may provide instructions on which any of the methods disclosed herein may be performed. The instructions 624 may provide source code and/or data code to the processor 602 to enable any one or more operations disclosed herein.

Various embodiments of the systems and methods disclosed herein enable appending template files and configuration files provided by a user to an existing archive of device driver generator tool. The block labels helps in reuse of device driver code for supporting the different device using same operating system. The customization tags help in synthesizing code that is device specific that forms a part of operating system framework or device interconnect specific. The addition of new configuration and template files by the user to the default template archive helps to adding support for new device classes and new operating system frameworks without the need for intervention from tool provider. By merging the new configuration and template files to the default template archive and using them during code generation, the output code generated for a device belonging to a particular device for a specified operating system may be easily modified. This also aids in adding support for new device classes or operating systems. New command line options are provided to specify special options to provide the tool with a user id and the name of a folder that includes configuration files and template files as arguments to allow the user to add new template code to the template archive. By maintaining a new archive file separately and storing the file name in a separate archive configuration file keeps each new archive independent of already existing archives. Additionally, the systems and methods of the present technology allows the user to modify the appended configuration files and template files in case errors or for enhancements without having to wait for the software provider to update the archive and send back to the user.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

We claim:

1. A system for customizing an archive of block labels and file labels of a device driver generator tool for a user by appending of a plurality of configuration files and a plurality of template files to obtain an appended archive file of block labels and file labels, wherein the device driver generator tool automatically generates a device driver that enables a first device to communicate with a second device, said system comprising:

one or more processors; and one or more non-transitory computer-readable mediums storing one or more sequences of instructions, which when executed by the one or more processors, cause:

extracting said plurality of configuration files and said plurality of template files from a template archive stored in said database, wherein said plurality of configuration files comprises one or more high level configuration files and one or more low level configuration files, wherein said one or more low level configuration files and said one or more high level configuration files comprises one or more labels;

receiving an information associated with at least one of each of: said plurality of template files and said plurality of configuration files, and at least one of said plurality of template files and said plurality of configuration files from said user, wherein said plurality of template files and said plurality of configuration files comprises one or more of: said block labels, said file labels, customization tags, and a template code;

verifying whether said archive of block labels and file labels for said plurality of configuration files and said plurality of template files is pre-existing in a database of said device driver generator tool;

generating said archive of block labels and file labels for said plurality of template files and said plurality of configuration files upon said archive of block labels and file labels associated with said plurality of template files and said plurality of configuration files not pre-existing in said database and storing a unique name and a unique archive identification for said generated archive of block labels and file labels in an archive configuration file;

appending said generated archive of block labels and file labels for said plurality of template files and said plurality of configuration files to a pre-existing archive in said database append said generated archive of block labels and file labels for said plurality of template files and said plurality of configuration files to a pre-existing archive in said database;

generating an error message upon said generated archive of block labels and file labels being pre-existing in said database;

extracting said template code from said plurality of template files for said block label to obtain an extracted template code; and generating a portion of said device driver corresponding to said block label based on said extracted template code.

2. The system of claim 1, further comprising generating said archive of block labels and file labels using a directory name, a user identifier and an archive count index.

3. The system of claim 2, further comprising:

verifying whether said generated archive of block labels and file labels was previously in use by checking whether a combination of said directory name, said user identifier and said archive count index associated with said generated archive of block labels and file labels is pre-existing in said database; and generating and communicating an error message to said user upon said generated archive of block labels and file labels being previously in use.

4. The system of claim 2, further comprising creating a name for said generated archive of block labels and file labels based on said user identifier and said directory name provided by said user as one or more command line arguments and an archive count index, wherein said user identifier, said directory name and said archive count index are appended to a plurality of block labels to avoid duplicates of a plurality of block labels associated with a default template archive.

5. The system of in claim 2, further comprising retrieving a plurality of block labels, a plurality of file labels, and a plurality of customization tags associated with said plurality of template files and said plurality of configuration files.

6. The system of claim 1, further comprising parsing a high-level configuration file forming part of said plurality of configuration files and corresponding to a class of a device, and process a plurality of block labels encountered in said high level configuration file.

7. The system of claim 6, further comprising:

parsing (i) said plurality of template files, and (ii) said plurality of configuration files to check whether said plurality of block labels are defined therein without duplication;

communicating an error message upon said plurality of block labels being defined in duplicate;

renaming said plurality of block labels by appending said user identifier, said directory name and said archive count index to avoid duplication of said block labels; and pre-associating with said pre-existing archive in said database that said generated archive of block labels and file labels is appended to.

8. The system of in claim 1, wherein said generated archive of block labels and file labels is subsequently used for generating a device driver.

9. A processor implemented method for customizing an archive of block labels and file labels of a device driver generator tool for a user by appending of a plurality of configuration files and a plurality of template files to obtain an appended archive file of block labels and file labels, wherein the device driver generator tool automatically generates a device driver that enables a first device to communicate with a second device, said processor implemented method comprising:

extracting said plurality of configuration files and said plurality of template files from a template archive stored in said database, wherein said plurality of configuration files comprises one or more high level configuration files and one or more low level configuration files, wherein said one or more low level configuration files and said one or more high level configuration files comprises one or more labels;

receiving an information associated with at least one of each of: said plurality of template files and said plurality of configuration files, and at least one of said plurality of template files and said plurality of configuration files from said user, wherein said plurality of template files and said plurality of configuration files comprises one or more of: said block labels, said file labels, customization tags, and a template code;

verifying whether said archive of block labels and file labels for said plurality of configuration files and said plurality of template files is pre-existing in a database of said device driver generator tool;

generating said archive of block labels and file labels for said plurality of template files and said plurality of configuration files upon said archive of block labels and file labels associated with said plurality of template files and said plurality of configuration files not pre-existing in said database and storing a unique name and a unique archive identification for said generated archive of block labels and file labels in an archive configuration file;

appending said generated archive of block labels and file labels for said plurality of template files and said plurality of configuration files to a pre-existing archive in said database append said generated archive of block labels and file labels for said plurality of template files and said plurality of configuration files to a pre-existing archive in said database;

generating an error message upon said generated archive of block labels and file labels being pre-existing in said database;

extracting said template code from said plurality of template files for said block label to obtain an extracted template code; and generating a portion of said device driver corresponding to said block label based on said extracted template code.

10. The processor implemented method of claim 9, wherein said archive of block labels and file labels is created using a directory name, a user identifier and an archive count index.

11. The processor implemented method of claim 9, further comprising:

determining whether said archive configuration file is existing in an archive directory;

checking said archive configuration file in a tool database upon said archive configuration file existing in said database;

splitting one or more records into an archive name and an identifier;

determining whether said archive name is already in use by comparing said archive name with a plurality of pre-existing archive file names in said database of said device driver generation tool; and generating an error message upon said archive name being in a duplicate in said database.

12. The processor implemented method of claim 9, further comprising:

reading a plurality of block labels from said received plurality of configuration files;

retrieving a block label from among said plurality of block labels;

searching for said retrieved block label in said plurality of template files and determining whether said block labels is defined in said plurality of template files;

printing a warning message upon said block label not being defined in said plurality of template files;

determining whether said block label is defined in duplicate in said plurality of template files upon said block label being defined in said plurality of template files;

generating an error message upon said block labels being specified in duplicate;

modifying said block label using said user identifier and said directory name and said archive count index to obtain a modified block label upon said block labels not being specified in duplicate;

updating (i) said plurality of configuration files, and (ii) said plurality of template files with said modified block label;

determining whether said modified block label is a last block label from among said plurality of block labels;

retrieving a next subsequent block label and repeating above for said retrieved subsequent block label, upon said modified block label not being said last block label;

generating a new template archive upon said modified block label being identified as said last block label; and appending said generated new archive name and an archive ID to said archive configuration file.

13. The processor implemented method of claim 9, wherein said user is allowed to organize said plurality of template files and said plurality of configuration files into a template files folder and a configuration files folder respectively, when said user is making changes in said plurality of template files and said plurality of configuration files respectively.

14. The processor implemented method of claim 9, further comprising: receiving a user identifier and a directory name from said user; and creating a name for said generated archive file of block labels and file labels based on said user identifier and said directory name that are provided by said user as command line arguments along with an archive count index obtained from said archive configuration file, wherein said user identifier and said directory name and archive count index are used to modify the block labels to avoid duplicates of block labels associated with a default template archive.

15. The processor implemented method of claim 9, further comprising: parsing a high-level configuration file, corresponding to a class of a device for which a device driver is generated; and processing a plurality of labels encountered in a high level configuration file, which is part of said plurality of configuration files.

16. A non-transitory machine-readable medium carrying one or more sequences of instructions which, when executed by one or more processors, cause the processors to execute a method for customizing an archive of block labels and file labels of a device driver generator tool for a user by appending of a plurality of configuration files and a plurality of template files to obtain an appended archive file of block labels and file labels, wherein the device driver generator tool automatically generates a device driver that enables a first device to communicate with a second device, comprising:

extracting said plurality of configuration files and said plurality of template files from a template archive stored in said database, wherein said plurality of configuration files comprises one or more high level configuration files and one or more low level configuration files, wherein said one or more low level configuration files and said one or more high level configuration files comprises one or more labels;

receiving an information associated with at least one of each of: said plurality of template files and said plurality of configuration files, and at least one of said plurality of template files and said plurality of configuration files from said user, wherein said plurality of template files and said plurality of configuration files comprises one or more of: said block labels, said file labels, customization tags, and a template code;

verifying whether said archive of block labels and file labels for said plurality of configuration files and said plurality of template files is pre-existing in a database of said device driver generator tool;

generating said archive of block labels and file labels for said plurality of template files and said plurality of configuration files upon said archive of block labels and file labels associated with said plurality of template files and said plurality of configuration files not pre-existing in said database and storing a unique name and a unique archive identification for said generated archive of block labels and file labels in an archive configuration file;

appending said generated archive of block labels and file labels for said plurality of template files and said plurality of configuration files to a pre-existing archive in said database append said generated archive of block labels and file labels for said plurality of template files and said plurality of configuration files to a pre-existing archive in said database;

generating an error message upon said generated archive of block labels and file labels being pre-existing in said database;

extracting said template code from said plurality of template files for said block label to obtain an extracted template code; and generating a portion of said device driver corresponding to said block label based on said extracted template code.

17. The non-transitory machine-readable medium of claim 16, wherein said method further comprises:

determining whether said archive configuration file is existing in a tool database;

checking said archive configuration file in said tool database upon said archive configuration file existing in said tool database;

splitting one or more records into an archive name and an identifier;

determining whether said archive name is already in use by comparing said archive name with stored plurality of pre-existing archive file names in said archive configuration file of said database of said device driver generation tool; and generating an error message upon said archive name being in a duplicate in said database.

18. The non-transitory machine-readable medium of claim 16, wherein said method further comprises:

reading a plurality of block labels from said received plurality of configuration files;

retrieving a block label from among said plurality of block labels;

searching for said retrieved block label in said received plurality of template files and determining whether said block label is defined in said received plurality of template files;

printing a warning message upon said block label not being defined in said plurality of template files;

determining whether said block label is defined in duplicate in said plurality of template files upon said block being defined in said plurality of template files;

generating an error message upon said block labels being specified in duplicate;

modifying said block label using said user identifier, said directory name, and said archive count index to obtain a modified block label upon said block labels not being specified in duplicate;

updating (i) said plurality of configuration files, and (ii) said plurality of template files with said modified block label;

determining whether said modified block label is a last block label from among said plurality of block labels;

retrieving a next subsequent block label and repeating steps above for said retrieved subsequent block label, upon said modified block label not being said last block label;

generating a new template archive upon said modified block label being identified as said last block label; and appending said generated new archive name and an archive ID to said archive configuration file associated with said database of said device driver generator tool.

19. The non-transitory machine-readable medium of claim 16, wherein said method further comprises:

receiving a user identifier and a directory name from said user; and creating a name for said generated archive file based on said user identifier and said directory name that are provided by said user as command line arguments along with an archive count index obtained from said archive configuration file, wherein said user identifier and said directory name along with said archive count index are used to modify block labels to avoid duplicates of block labels associated with a default template archive.

20. The non-transitory machine-readable medium of claim 16, wherein said method further comprises:

parsing a high-level configuration file, corresponding to a class of a device for which a device driver is generated; and processing a plurality of labels encountered in a high level configuration file, which is part of said plurality of configuration files.

* * * * *